United States Patent [19]

Luton, Jr.

[11] 3,711,744
[45] Jan. 16, 1973

[54] PASSIVE ENERGY DUMP FOR SUPERCONDUCTING COIL PROTECTION

[75] Inventor: James N. Luton, Jr., Oak Ridge, Tenn.

[73] Assignee: The United States of America as represented by the United States Atomic Energy Commission

[22] Filed: June 1, 1972

[21] Appl. No.: 258,678

[52] U.S. Cl. .................................317/13 D, 307/245
[51] Int. Cl. ..............................................H03k 3/38
[58] Field of Search..............317/13 D; 307/245, 306

[56] References Cited

UNITED STATES PATENTS

| 3,270,247 | 8/1966 | Rosner | 317/13 D |
| 3,305,699 | 2/1967 | Watrous et al. | 317/13 D |
| 3,466,504 | 9/1969 | Hart | 317/13 D |
| 3,474,294 | 10/1969 | Weaver | 317/13 D |

*Primary Examiner*—James D. Trammell
*Attorney*—Roland A. Anderson

[57] ABSTRACT

A passive resistance type energy dump for the protection of the coils of a superconducting magnet is provided. Insertion heaters are immersed in a rigid container filled with a fusible alloy. The energy dump is connected across the coils of the superconducting magnet wherein individual heater elements are connected singly to the windings or otherwise according to the energy dumping requirements upon transition of the magnet to a normal state.

6 Claims, 4 Drawing Figures

PASSIVE ENERGY DUMP FOR SUPERCONDUCTING COIL PROTECTION

BACKGROUND OF THE INVENTION

This invention was made in the course of, or under, a contract with the United States Atomic Energy Commission.

No matter how stable a superconducting magnet is designed to be, there is always a chance of some kind of failure occurring which could cause propagation or persistence of a nonsuperconducting (normal) region. The supply of liquid helium may be insufficient to keep such a region cool, and then serious damage may be caused by overheating, thermal strains, or excessive vapor formation.

The primary goal of any protection system is to prevent damage from overheating. The temperature of any part of the superconducting coil winding must never exceed a certain limit. This limit will take into account the effect of heat on the materials used, the permissible expansion stresses, overpressure due to rapid gas evolution, etc. As a second goal, the method of protection must prevent electrical breakdown, that is, the voltage differences within the winding must never exceed the insulation limit.

One of the known methods of protecting superconducting coils from excessive temperatures during superconducting-to-normal transitions is the provision of an external resistor across the coil terminals. The current capacity of such an energy dump should be equal to or greater than the coil current. In order to increase the fraction of stored magnetic energy which would be released in the dump rather than in the coil windings, the resistance of the dump should be as large as possible without leading to a voltage high enough to damage the coil insulation, and some means must be provided, such as coolant flow, for cooling the resistor during transitions of the magnetic coils to alleviate the heat transfer problems in the cryogenic environment.

A method of protection of an energy dump that is completely passive would be preferable to one requiring coolant flow, valves, interlocks, etc. The reason for this is that an energy dump may be unused and ignored for long periods and then energized without warning. Further, an ideal energy dump would liberate the stored magnetic energy directly into the bulk material of the dump, thereby avoiding heat transfer problems in the cryogenic environment. The thermal capacity of the dump should, of course, be sufficient to prevent overheating.

There exists a need for a passive energy dump for the quadrupole superconducting coils of the IMP facility at the Oak Ridge National Laboratory. The IMP facility is an experimental device utilized infusion research for heating plasma, for example. The design features of the magnet coils of this facility are described in Report ORNL-4688, issued Aug., 1971, pp. 112-117, and will provide a maximum field at the coil windings of about 80 KG. In order to provide a passive energy dump that would be adequate for such a powerful magnetic system upon its transition to normal, the dump would have to dissipate three megajourles, with a maximum current and voltage of 830 amperes and 300 volts. The present invention was conceived to meet this need in a manner to be described hereinbelow.

SUMMARY OF THE INVENTION

It is the object of the present invention to provide a passive energy dump for the protection of superconducting coils. The above object has been accomplished in the present invention by utilizing a plurality of insertion heaters which are immersed in a rigid container filled with a fusible alloy which arrangement serves as the energy dump that is connected across a superconducting coil or coils, and individual heater elements of the dump are connected singly or otherwise according to the energy dumping requirements.

DESCRIPTION OF THE PREFERRED EMBODIMENTS

Figure 4:
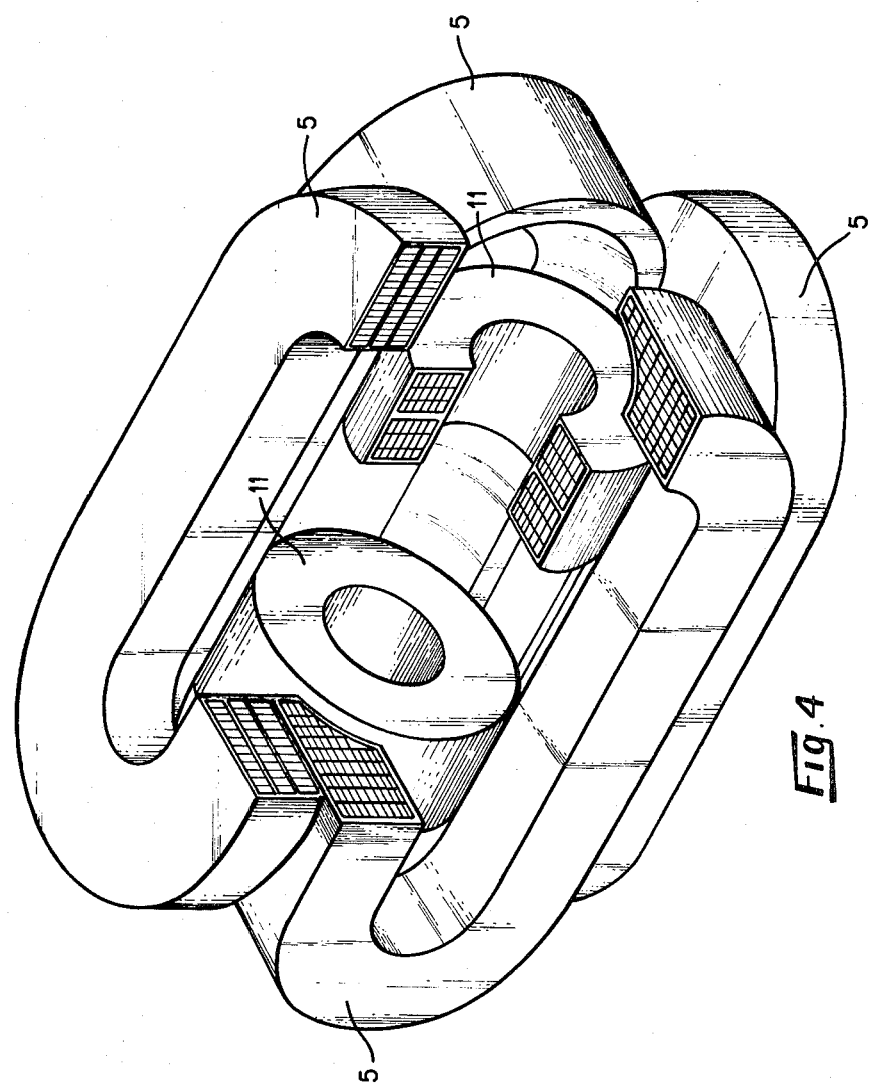
FIG. 4 is a partial cut-away view of the quadrupole coils and mirror coils of the ORNL IMP facility in which the present invention is utilized.

The superconducting coil system of the Oak Ridge National Laboratory IMP fusion research facility is illustrated in FIG. 4 of the drawings, wherein there are provided mirror coils 11 and quadrupole coils 5, and the whole coil system is adapted to be cooled in a cryogenic environment by means, not shown, in a conventional manner. The quadrupole coils 5 are fabricated from $Nb_3Sn$ superconducting ribbon and other design details are set forth in the above-mentioned Report, ORNL-4688.

The present invention was conceived to provide a passive energy dump for the superconducting quadrupole coils 5 of FIG. 4, and the system for accomplishing this will now be described.

Figure 1:
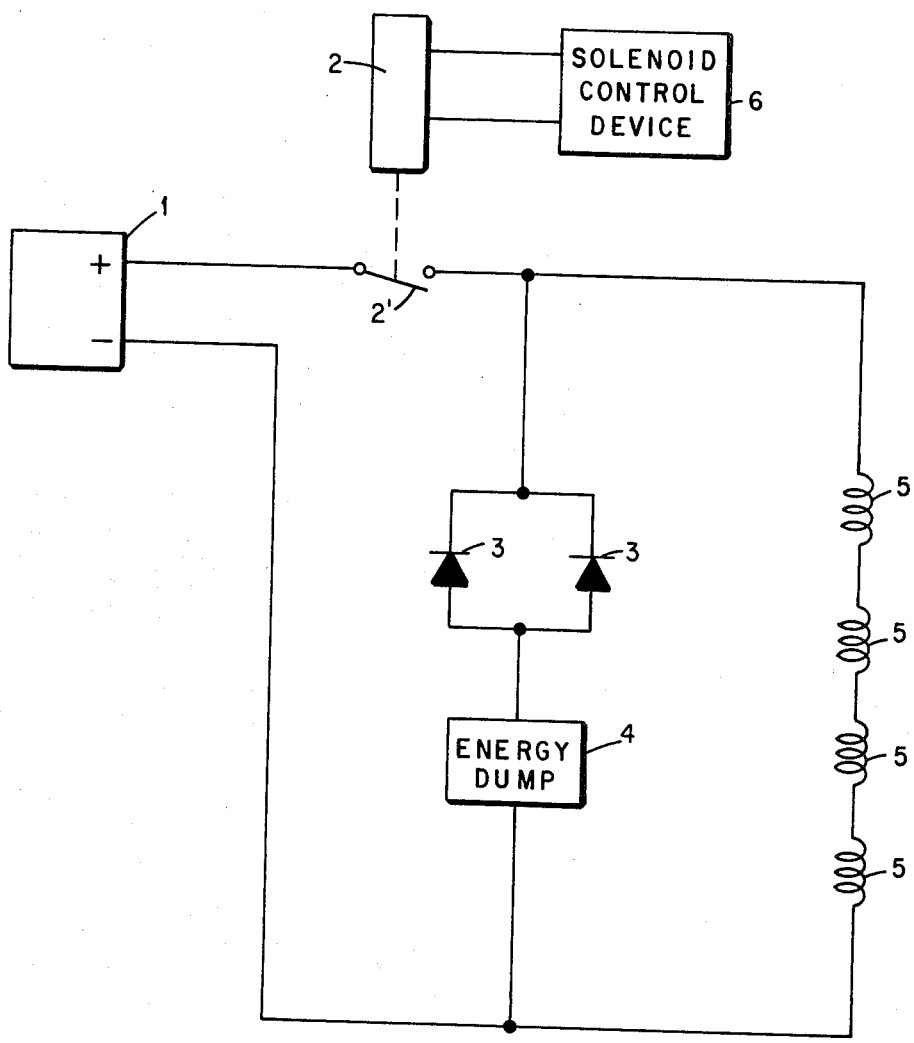
FIG. 1 is a schematic wiring diagram of the protection system of the present invention.
Figure 2:
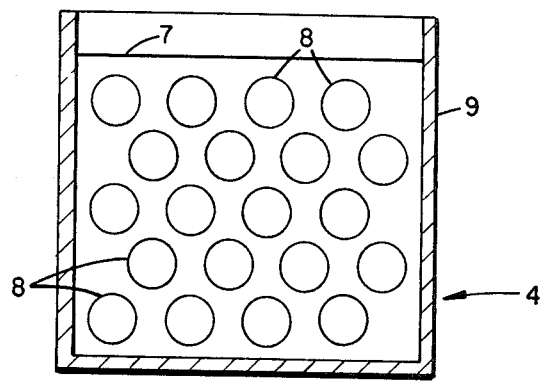
FIG. 2 is a schematic sectional view of the energy dump of FIG. 1.
Figure 3:
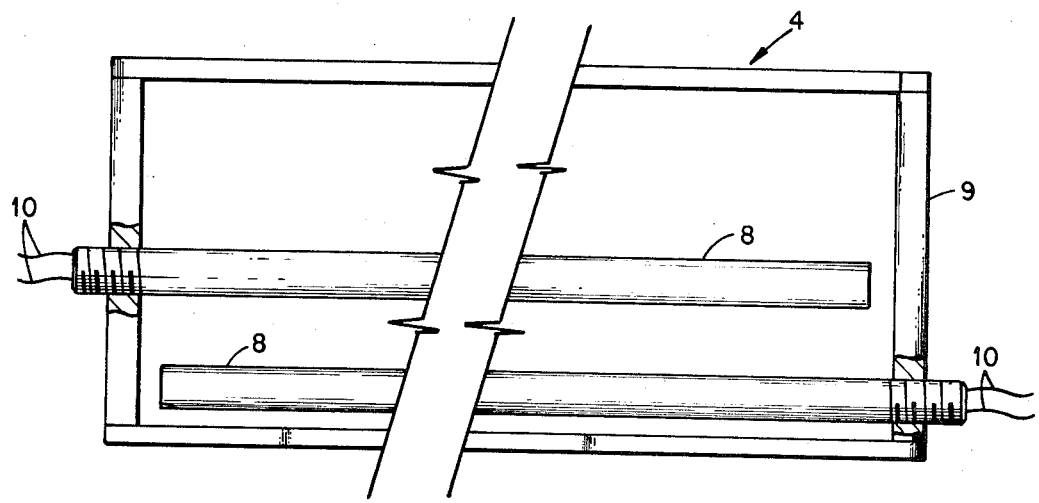
FIG. 3 is a partial top view of the energy dump of FIG. 2, showing only two of the insertion heaters.

As illustrated in FIG. 1, the four quadrupole coils 5 of FIG. 4 are connected in series and to a DC power supply 1 by way of a pair of contacts which are closed by an armature contact are 2' of a solenoid 2 which in turn is controlled by a control device 6. The power supply 1 actually comprises two 10-volt, 500-ampere power supplies in parallel. Connected across the series connected coils 5 are a pair of diodes 3 and a passive energy dump 4, as shown in FIG. 1. The details of the dump 4 are illustrated in FIGS. 2 and 3 to be described hereinbelow. The parallel connected diodes 3 are rated at 600 amperes each and are utilized to prevent dissipation of power in the dump 4 during charging and normal use of the coils 5. The solenoid controlled switch 2' is opened to protect the power supply 1 when a dump occurs.

The solenoid control device 6 may be controlled in response to an abnormal operating condition associated with the coils 5 to protect the power supply by effecting an open circuit by the contact arm 2' of the solenoid 2 in one of the following four ways: (1) helium level indicator, (2) monitoring the coil voltage, (3) building power is lost, or (4) manually.

The details of the passive energy dump 4 of FIG. 1 are illustrated in FIG. 2 and FIG. 3 of the drawings. As shown in FIG. 2, there are 5 rows of 4 heaters in each row. Adjacent rows of heaters 8 are screw inserted from opposite ends of a rigid tank 9 as more clearly illustrated in the top view of the tank, as shown in FIG. 3. Only two heaters 8 are shown in in FIG. 3 for the sake of clarity. Each of the heaters 8 is typically 1 inch in diameter and 8 inches long. The heaters 8 may be "Firerods" manufactured by Watlow Electric Mfg. Company. These are sheathed heaters, somewhat larger in diameter than calrod heaters. They are designed for high power densities, and can withstand very high temperatures when inserted in a suitable heat transfer medium. The sheath material may be stainless steel. Each of the heaters 8 is provided with one or more pairs of electrical energizing lead 10.

The heaters 8 of the dump 4 are immersed in a pool of fusible alloy 7 which should be ¼-inch or more above the highest energized heater. The fusible alloy 7 may be an eutectic mixture of bismuth and lead. It melts at 255° F, has relatively small volume changes, and is docile up to its boiling point of 3036° F. It is marketed as "Cerrobase" the Cerro Corporation.

When the heaters 8 are immersed in Cerrobase, they can withstand 600 to 700 watts per square inch of sheath, and the bond to the heater sink alloy is insured as the alloy expands slightly (after solidification) within the rigid container 9. The thermal capacity of the dump 4 can be adjusted by varying the number of heaters that are energized and the amount or composition of the alloy. The resistance and current capacity may be set by proper electrical connection of the heaters, each of which may contain more than one resistive element to increase the number of possibilities.

When the protection circuit of FIG. 1 is to be utilized for the quadrupole coils 5 of the coil system of FIG. 4, then only four rows of heaters 8 of the dump 4 would normally be required and would be connected in parallel and in series with the diodes 3 across the coils 5. This would provide for an initial resistance of 0.36 ohm, heated surface area of 377 in$^2$ at 663 W/in$^2$, heat sink weight of about 47 lbs., and a current capacity of 830 amperes which should be adequate for protection of the coils 5 during a transition-to-normal when and if such an event should occur.

A preferred embodiment of the present invention is to utilize as the winding for the resistance wires of the immersion heaters 8, an alloy of 70 percent nickel and 30 percent iron whose electrical resistance increases with increasing temperature by a factor of about 5 at 1,400° F. This feature of a rising resistance as more energy is deposited is very desirable. The voltage would fall more slowly and less energy would be released in the coils than if the dump resistance were constant. This nickel-iron alloy is available commercially in wire form and is known as "Balco" manufactured by the W. B. Driver Company.

It should be understood that if a larger current capacity for the dump 4 is necessary or required, then some or all of the remaining four heaters in the top row of the dump of FIG. 2 can be connected into the circuit, and an additional row or rows of alloy immersed heaters could be provided and connected as needed.

The above-described invention is not limited to the specific control circuitry set forth. For example, the dump 4 of the drawings could be connected and controlled in a different manner to protect the magnet coils 5. In such an embodiment, not shown, a resistor which is a length of superconductor held at superconducting temperature and the energy dump 4 are connected in parallel and this parallel network is connected across the coils 5. The superconductor resistor can be made to operate as a switch by energizing a heater wrapped around it, causing a warm spot, and causing the resistor to go normal. When this happens, then the dump 4 would be switched into the shunt circuit across the coils 5 for their protection. As long as the resistor and the magnet coils are operating in their normal manner under superconducting conditions, then the energy dump would be shunted out of the circuit by the superconducting resistor, and in response to an abnormal operating condition, the superconducting resistor could be made to go normal, thus switching in the energy dump. Such an operation could be termed "Persistent Mode."

This invention has been described by way of illustration rather than limitation and it should be apparent that it is equally applicable in fields other than those described.

What is claimed is:

1. A protective system for a superconducting magnet upon its transition to a normal state comprising a power supply connected to the coils of said magnet, a solenoid provided with an armature switching arm for making and breaking a circuit between said power supply and said coils, an energy dumping network connected directly across said coils, said dumping network including a pair of parallel connected diodes connected in series with a passive energy dump, and a solenoid control device connected to said solenoid for effecting a breaking of the circuit between said power supply and said coils by said solenoid switching arm in response to an abnormal operating condition associated with said coils, said passive energy dump protecting said magnet coils during their transition to normal, said dump comprising a plurality of elongated electrical heaters immersed in a fusible alloy within a rigid container, whereby said heaters and said alloy serve as an energy dump whenever excess and potentially destructive energy produced by a sudden collapse of the magnetic field of said magnet is transferred from said magnet to said heaters and their encompassing fusible alloy.

2. The system set forth in claim 1, wherein each of said heaters is wound with an alloy wire whose electrical resistance increases with increasing temperature.

3. The system set forth in claim 2, wherein said alloy wire is 70 percent nickel and 30 percent iron.

4. The system set forth in claim 2, wherein said electrical heaters are 1 inch in diameter, 8 inches long and are sheathed, and said fusible alloy is an eutectic mixture of bismuth and lead.

5. The system set forth in claim 4, wherein the number of said heaters is at least 16 comprising 4 rows of four heaters each.

6. The system set forth in claim 5, wherein said magnet coils are quadrupole coils connected in series with said power supply, and said heaters are connected in parallel with each other and in series with said diodes across said coils to provide a dumping current capacity of at least 830 amperes for the protection of said magnet coils.

* * * * *